July 5, 1966 L. W. GOLDBERG 3,258,915
CONTROL SYSTEM

Filed July 9, 1962 2 Sheets-Sheet 1

INVENTOR.
LLOYD W. GOLDBERG
BY
Thomas W. Brennan
AGENT

United States Patent Office 3,258,915
Patented July 5, 1966

3,258,915
CONTROL SYSTEM
Lloyd W. Goldberg, Clifton, N.J., assignor to Thiokol
Chemical Corporation, Bristol, Pa., a corporation of
Delaware
Filed July 9, 1962, Ser. No. 208,216
5 Claims. (Cl. 60—35.54)

The present invention relates to jet propulsion motors and in particular to an apparatus or device for thrust control thereof. The principal object of the invention is to provide an improved means for thrust control in a jet propulsion motor wherein the motor nozzle or portions thereof are movable to provide said thrust control.

In carrying out the object of the present invention a jet propulsion motor is provided having a nozzle which includes flexible members. Upon actuation of said members, motor thrust, as represented by a thrust vector, undergoes a positional change such that a turning moment is applied to the vehicle containing the jet propulsion motor. A further object of the invention is to provide a jet propulsion motor having a movable throat in the nozzle thereof which is capable of being moved by an externally mounted actuating means to effect a lateral displacement of said thrust vector, thereby inducing a turning moment about the center of gravity of the vehicle containing the motor. A still further object of the invention is to provide a jet propulsion motor wherein downstream portions of the motor nozzle are flexibly connected to the remainder of the motor and are actuated by externally mounted means so as to provide an angular and/or lateral displacement of the thrust vector to induce a turning moment of the vehicle about its center of gravity.

Other objects of the invention will be pointed out in the following description and claims and illustrated in the accompanying drawings, which disclose by way of examples, the principle of the invention and the best mode, which has been contemplated, of applying that principle.

Figure 1:
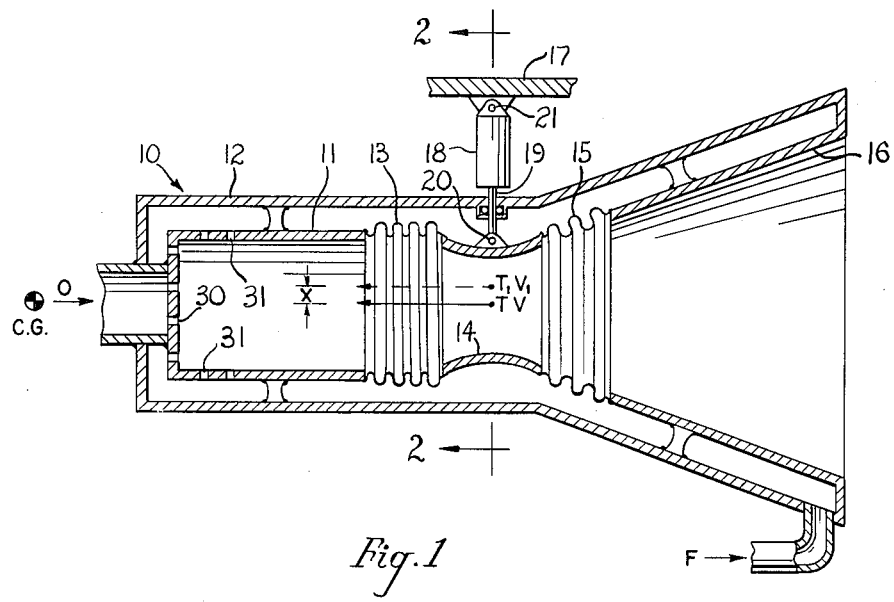
FIGURE 1 is a schematic elevational view of a type of jet propulsion motor for which the present invention is adapted showing the general location of flexible parts.

Referring to FIG. 1 there is shown a form of the invention wherein it is adapted for installation in a jet propelled vehicle such as an airplane, missile or the like. The invention as set forth in FIG. 1 consists of a rocket or jet motor 10 having inner and outer shells 11 and 12 respectively, and a movable throat 14 mounted between a flexible member such as cylindrical bellows 13, and a second flexible member such as conical bellows 15. Flexible members 13 and 15 form structural parts of motor 10 being extensions of inner liner 11 and expansion cone 16. Connection of bellows 13 to shell liner 11 and to movable throat 14 is accomplished by any manner well known to those skilled in the art, as for example, by welding as shown in the drawings.

Shells 11 and 12 are representative of the usual arrangement in the regeneratively cooled liquid propellant rocket motor construction art wherein two, essentially concentric, shells are constructed so as to permit the passage therebetween of a cooling fluid. In the usual practice the cooling fluid is one or more of the liquid propellants which are thereafter combusted within the confines of the motor, although a separate coolant such as water may be employed. The former arrangement is contemplated therein for illustrative purposes, but should not be construed as limitative thereto.

Figure 2:
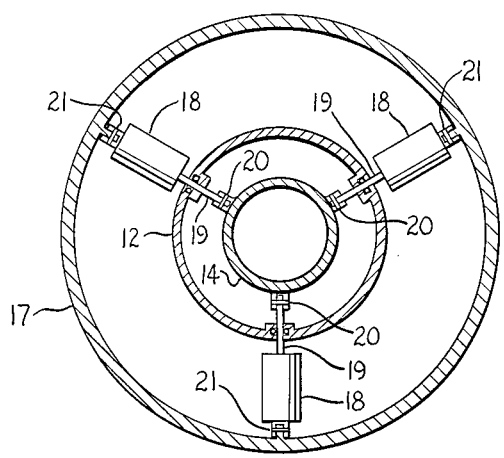
FIGURE 2 is a section of the motor taken along the lines 2—2 of FIGURE 1.

When constructed as described herein, throat 14 is usually formed as shown, with entrance and exit having larger diameters than the intermediate sections so as to present to the gases passing therethrough a relatively smooth and contoured path whereby the gases may be accelerated through the motor. Since throat 14 is in effect "suspended" between the flexible members 13 and 15, movement thereof relative to the remainder of motor 10 is readily accomplishable. Therefore, attached to throat 14 and to the flying vehicle structure 17, shown in outline in FIGURE 1 for illustrative purposes, is an actuating means consisting of a piston containing hydraulic cylinder 18, connected rod 19 and swivel connectors 20 and 21 attached to throat 13 and body 17 respectively, for that purpose. FIGURE 2 shows a typical installation wherein a system of three such piston containing cylinders 18 are used to effect movement of throat 14 in any of three directions, or a combination thereof.

Figure 3:
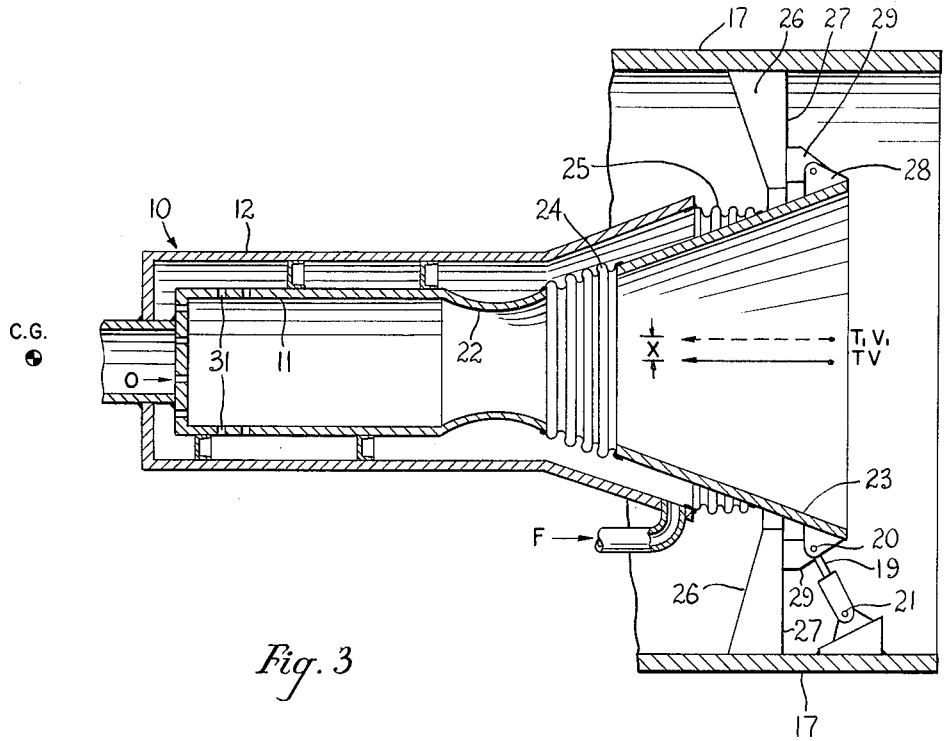
FIGURE 3 is a second schematic elevational view of the invention in a somewhat different version and is illustrative of its important features.

FIGURE 3 is illustrative of a second embodiment of the invention, wherein the usual jet propulsion motor 10 comprises inner and outer shells 11 and 12, a throat 22 and an expansion nozzle or exit cone 23. Expansion nozzle or exit cone 23 is connected to the throat 22 by means of a flexible member or conical bellows 24, and to outer shell 12 by a second flexible member of cylindrical bellows 25. Similarly to the invention of FIGURE 1, the space between shells 11 and 12 is provided for passage therethrough of cooling fluid, usually one of the propellants in liquid propellant rocket engines. In this embodiment actuating cylinders 18 (one shown) are again mounted to body 17 by connectors 21. Attachment to motor 10 is accomplished through connectors 20 and rod 19. However, vehicle body 17 is provided with an annular end piece or bearing plate 26 having a smooth faced surface 27. Connecting link 28 is equipped with a flat sided follower 29, which through suitable pin attachment is adaptable to contact bearing plate 26 in a hereinafter described restraining manner.

In a manner similar to the invention of FIGURE 1, wherein throat 14 was in effect "suspended" between bellows 13 and 15, expansion cone 23 is "suspended" between flexible elements or bellows 24 and 25. As will be shown in what follows, flexible members or bellows 24 and 25 in cooperation with actuating cylinder 18 permit a lateral shift (FIG. 2) or in cooperation with cylinders 18–a and 18–b permit an angular displacement (FIG. 4) of cone 23 which results in a corresponding shift in thrust or of the thrust vector representative thereof.

The invention herein described has particular application, but is not limited, to a jet propulsion motor of the type wherein thrust is produced by the expulsion of high speed gases from the interior thereof, being useful in any system wherein thrust vector control is desirable. In the usual case gases are produced by the combustion of propellants in a motor chamber. Propellants are usually one of the so-called solid or liquid type. For illustrative purposes the latter type wherein an oxidizer enters a chamber, such as defined by shell 11, at "O," through orifices 30, together with a fuel (after being conducted through the space between shells 11 and 12 by means of pipe F) through orifices 31, ignited and burned. The gases thus produced are accelerated in the motor and expelled at high speed from expansion or exit cones 16 (FIG. 1) and 23 (FIG. 3 and FIG. 4).

In the device of FIGURE 1 when actuating cylinder 18 through its contained hydraulic pressure extends connecting rod 19, a displacement or shift of throat 14 through a finite distance "X," occurs. This shift results in a transverse deflection of the motor thrust (or a portion thereof) as represented by thrust vector TV (solid arrow, FIG. 1), to a new position $T_1V_1$ (dash arrow FIG. 1). Deflection or shift of the thrust vector results in the development of a turning moment acting on the flying vehicle containing the motor which is equal to the shifted thrust $T_1V_1$ multiplied by the distance "X," since the undeflected thrust vector TV, as is the usual practice, passes through the vehicle center of gravity (C.G. in FIGS. 1 and 3).

In the FIG. 3 arrangement the same, or similar, result with respect to the thrust vector TV, is obtained. However, in this latter embodiment, upon actuation of any one of the piston containing actuating cylinders 18, expansion or exit cone 23 is caused to move in cooperation with flexible members or bellows 24 and 25, bearing plate 26, and flat sided follower 29, in a direction transverse to the motor 10 and/or vehicle 17 longitudinal axis through a distance "X." Expansion cone 23 is restrained from any movement except a translation normal to the axis above-mentioned by angular mounting of actuating cylinders 18, which urge expansion cone 23 forwardly against the direction of the exiting gases. In addition, follower 29, which is provided with a flat surface of sufficient area in contact with bearing plate surface 27 helps to prevent any other movement. Follower 29 may also be equipped with bearings (not shown) for relatively freer movement over surface 27. Thus a similar turning moment substantially equal to the shifted or deviated, thrust vector $T_1V_1$ (dash arrow FIG. 3), multiplied by the distance "X" is developed, and acts upon the vehicle. Control of the vehicle is therefore limited by the length of stroke of rod 19 of cylinders 18 of which a minimum of two are required for all manner of movement over the plane of bearing plate surface 27. Of course, as a practical consideration, the actual number is determined by the space available within the vehicle.

Figure 4:
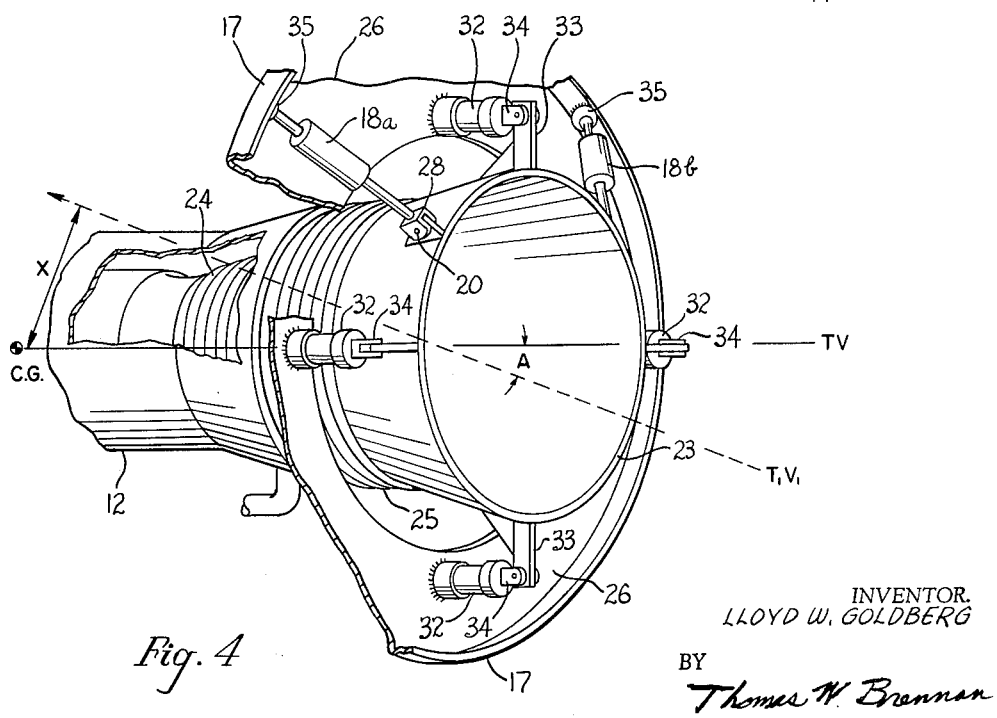
FIGURE 4 is a rearward perspective view of a missile showing an actuation means wherein a variation in thrust vector displacement is obtained in conjunction with the invention of FIGURE 3.

In FIG. 4 a still further embodiment is shown wherein double acting cylinder 18–a and 18–b (minimum two in number) are mounted on missile or vehicle 17 by means of universal connectors 35 and attached to expansion cone 23 such that cone 23 is restrained from movement in a rearward direction, being forced or biased against extensible two-way cushion mounts 32 through posts or abutments 33 and mounting connectors 34. Two-way cushion mounts 32 are capable of acting so as to contract or elongate depending on the manner of loading and are cooperative with cylinder 18–a and 18–b and bellows 24 and 25 to effect an angular displacement of cone 23. For instance, if one or both of cylinders 18–a or 18–b is actuated, cone 23 pivots about the longitudinal axis through an angle A (FIG. 4) to provide control of thrust thereabout. As illustrated in FIG. 4 with no angular displacement of expansion cone 23 the thrust of motor 10, represented by thrust vector TV, acts along the longitudinal axis of the vehicle 17 in accordance, usually, with design requirements of the system. Cylinders 18–a and 18–b as shown are mounted on vehicle 17 and cone 23 at right angles to each other, hence actuation of one cylinder causes a responsive, cooperative action on the part of the other such that practically any preselected angular displacement of cone 23 can be achieved by properly actuating the cylinders either singly or together. As an example, if cylinder 18–a is extended, cone 23 will pivot accordingly and thrust vector TV will pivot through an angle A to new position $T_1V_1$ to provide a moment about vehicle 17 C.G. equal to $T_1V_1$ times the displacement distance "X." It is evident that by proper control of actuation cylinder 18–a and 18–b, which are double acting, that all angular displacements are possible within the limits determined by the length of stroke of pistons contained by cylinders 18–a and 18–b.

While there have been shown, described and pointed out the fundamental and novel features of the invention as applied to two preferred embodiments, it will be understood that various omissions, substitutions and changes in the form and details of the device illustrated and in its operation may be made by those skilled in the art, without departing from the spirit of the invention. It is the intention, therefore, to be limited only as indicated as the scope of the following claims.

What is claimed is:

1. A thrust control device for a nozzle containing jet propulsion motor, said motor being mounted in a flying body, said nozzle comprising, a throat section, a first flexible member upstream of said throat section and attached thereto, an expansion cone section downstream of said throat section, a second flexible member interconnecting said sections, motion transmitting means secured to the flying body and to said throat section, said motion transmitting means and said flexible members being cooperative to effect only a lateral movement of said throat section to transversely displace said motor thrust with respect to the center of gravity of said flying body for applying a turning moment on said flying body about said center of gravity.

2. The device of claim 1 wherein the flexible member is a bellows.

3. The thrust control device of claim 1 wherein the motion transmitting means comprises a pair of hydraulic cylinders each comprising a pressure operated piston therewith, a piston rod extensible from said piston, swivel means on said rod for connecting said rod to said throat section, and swivel means on said cylinder for connecting said cylinders to said vehicle, said cylinder connecting means on said vehicle disposed thereabout so as to define an angle of at least 90° therebetween.

4. The thrust control device of claim 1 wherein the motion transmitting means consists of a system of at least three hydraulic cylinders each comprising a pressure operated piston therewithin, a piston rod extensible from said piston, said piston rod swivably connected to said throat section, and each said cylinder swivably connected to said flying body and positioned around the said throat section and within said vehicle so as to define an angle of at least 120° therebetween.

5. A thrust control device for a nozzle containing jet propulsion motor, said motor mounted in a flying body comprising, a throat in the nozzle, a portion of said nozzle comprising a first flexible member connected to the upstream side of said throat, a second flexible member attached to the downstream side of said throat, an expansion cone fixed with respect to said flying body and connected to said second flexible member downstream thereof, at least one piston containing actuating means attached to said throat and to said flying body for transversely displacing said throat with respect to the longitudinal axis of said motor to create a turning moment on said flying body about its center of gravity.

References Cited by the Examiner

UNITED STATES PATENTS

| 2,968,149 | 1/1961 | Graham et al. | 60—35.55 |
|---|---|---|---|
| 3,032,982 | 5/1962 | Gaubatz | 60—35.55 |
| 3,090,198 | 5/1963 | Zeisloft | 60—35.54 X |
| 3,140,584 | 7/1964 | Ritchey et al. | 60—35.55 |

FOREIGN PATENTS 687,482   4/1930   France.

MARK NEWMAN, *Primary Examiner.*

SAMUEL LEVINE, ABRAM BLUM, *Examiners.*

W. A. SCHUETZ, A. L. SMITH, *Assistant Examiners.*